(12) United States Patent
Shanmukham et al.

(10) Patent No.: US 12,353,354 B2
(45) Date of Patent: *Jul. 8, 2025

(54) REFRESHING MULTIPLE TARGET COPIES CREATED FROM A SINGLE SOURCE

(71) Applicant: Dell Products L.P., Round Rock, TX (US)

(72) Inventors: Roopashree Shanmukham, Bangalore (IN); Shivasharan Dalasanur Narayana Gowda, Kolar (IN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,458

(22) Filed: Mar. 12, 2024

(65) Prior Publication Data

US 2024/0256487 A1 Aug. 1, 2024

Related U.S. Application Data

(63) Continuation of application No. 17/643,090, filed on Dec. 7, 2021, now Pat. No. 11,934,349.

(51) Int. Cl.
*G06F 16/11* (2019.01)

(52) U.S. Cl.
CPC .......... *G06F 16/128* (2019.01); *G06F 16/125* (2019.01)

(58) Field of Classification Search
CPC ............................ G06F 16/128; G06F 16/125
USPC ....................................................... 707/639
See application file for complete search history.

(56) References Cited

U.S. PATENT DOCUMENTS

| 7,363,332 B2 * | 4/2008 | Berkowitz ............ G06F 16/273 |
| | | 707/999.001 |
| 9,612,769 B1 | 4/2017 | Thangapalam et al. |
| 9,665,437 B2 * | 5/2017 | Bhargava ............ G06F 11/1464 |
| 2013/0262387 A1 | 10/2013 | Varadharajan et al. |

* cited by examiner

*Primary Examiner* — Robert W Beausoliel, Jr.
*Assistant Examiner* — Lauren Zannah Ganger
(74) *Attorney, Agent, or Firm* — Workman Nydegger

(57) ABSTRACT

One example method includes refreshing secondary or repurposed copies. A copy data management system issues a single request that allows multiple secondary copies to be refreshed using an API server. The server allows a storage controller to read data from a single source and then write the data read from the source to multiple targets simultaneously, thereby refreshing multiple copies in parallel.

20 Claims, 4 Drawing Sheets

REFRESHING MULTIPLE TARGET COPIES CREATED FROM A SINGLE SOURCE

FIELD OF THE INVENTION

Embodiments of the present invention generally relate to copy data management. More particularly, at least some embodiments of the invention relate to systems, hardware, software, computer-readable media, and methods for managing data copies and to application copy repurposing.

BACKGROUND

Repurposed or secondary copies, by way of example, refer to a copy of a copy. For example, a snapshot or other copy of production data may be generated and may be a referred to as a primary copy of the production data. A copy of that primary copy can be referred to as a repurposed or secondary copy.

Copy data management, however, involves more than creating a secondary copy of the primary copy. Many entities, for example, may use multiple secondary copies of the production data and the use of those copies is also part of copy data management. As the number of secondary copies increases, performing copy data management operations becomes more complicated.

For example, secondary copies can grow stale over time in part because of the continual changes being made to the production data. As a result, there is need to refresh the secondary copies of the production data. This operation requires substantial time when the secondary copies are refreshed from a single source. In fact, parallel refresh operations often fail.

More specifically, an attempt to refresh a particular secondary copy may fail because the source is being used to refresh another secondary copy. As a result, refresh operations, in the context of copy data management, are often performed serially or sequentially. Refresh requests may be queued and processed in the order the requests were received. This can impact performance and requires significant time to process the queue. There is a need to improve the manner in which secondary copies are controlled, managed, and/or refreshed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
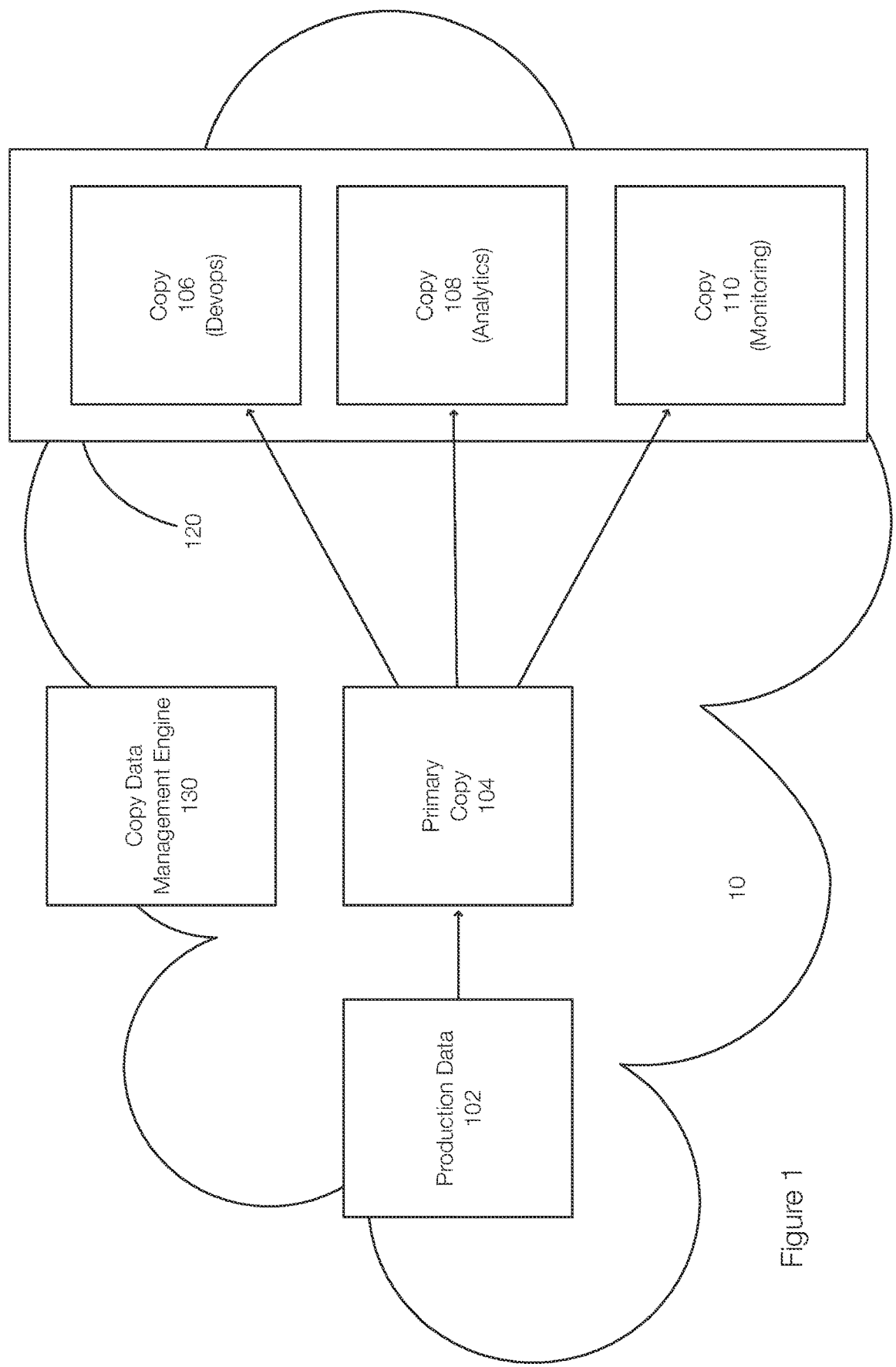
FIG. 1 discloses aspects of copy data management engine configured to refresh multiple secondary copies with FIG. 2 discloses aspects of a system configured to perform operations to refresh multiple targets in parallel from a single source or a single copy.

Embodiments of the present invention generally relate to copy data management. More particularly, at least some embodiments of the invention relate to systems, hardware, software, computer-readable media, and methods for copy data management operations.

Example embodiments of the invention further relate to methods for refreshing repurposed or secondary copies of production data created from a single source or from a single source device. Copy data management operations include, but are not limited to, snapshot operations, backup operations, copy operations, thread management operations, thread spawning operations, refresh operations, or the like or combination thereof.

Copy data management operations are often performed or initiated by a copy data management engine. The copy data management engine is configured to manage secondary copies, which may include creating secondary copies, deleting secondary copies, refreshing secondary copies, and the like or combinations thereof.

The lifecycles of secondary copies are managed by the copy data management engine. A lifecycle of a secondary copy may begin by creating the secondary copy. Over time, the secondary copy may be refreshed (e.g., refreshed with data to a more recent or current version of the production data). The lifecycle of a secondary copy may end when the secondary copy is deleted.

Secondary copies are often refreshed at least because the production data associated with the secondary copies is continually changing. By refreshing the secondary copies, any outputs, predictions, inferences, or other results generated from using the secondary copies is thus related to more recent production data and production computing systems.

Secondary copies can be managed independently and may be refreshed in a serial manner in conventional systems. As previously stated, secondary copies are conventionally refreshed serially because the storage array often fails a parallel execution call to refresh a secondary copy when another refresh operation is in progress from the same source (the same primary copy). Thus, refresh operations are typically queued such that the various secondary copies related to the same source or same primary copy are refreshed serially. This, however, can take a long time and can impact the rate at which secondary copies are refreshed.

Embodiments of the invention improve copy data management operations by performing batch refresh operations. This allows multiple secondary copies to be refreshed at the same time in parallel. In one example, a storage application programming interface (API) is provided that allows multiple targets (e.g., repurposed copies) to be refreshed from the same source or the same source device. The storage API can be consumed by the copy data management engine to improve the management of secondary copies.

When the storage API is used, the source data is read a single time and the data read from the source is written to multiple targets via multiple threads in parallel. A call to the storage API provides true concurrency for refreshing multiple secondary copies of the same source copy.

Refreshing secondary copies is optimized at least because the source copy is read a single time and the write operations are multi-threaded operations. Intermediate inefficiencies such as (i) handling multiple refresh workflows for the same source device, (ii) multiple API requests sent from the copy data management engine to the storage array, and (iii) processing and responding to multiple requests, are avoided.

The copy data management engine can refresh multiple secondary copies with a single request.

Embodiments of the invention are discussed in the context of production data, copies of the production data (e.g., gold or primary copies) such as snapshots, backups, and the like, and secondary copies of the production data or of the primary copies such as repurposed copies or clones. These data (e.g., the production data, the primary copies, and the secondary copies) may be stored on physical storage devices, storage arrays, or the like. These data may also be stored in an on-premise storage system, in the cloud (datacenter), or the like or combination thereof. These data may also be stored in different storage arrays, the same storage arrays, and/or in different geographic locations.

FIG. 1 discloses aspects of copy data management operating in a computing environment. The environment 10 may include an on-premise network, a cloud network, or the like or combination thereof. The various engines, servers, clients, and devices in the environment 10 may operate in different locations and may be connected using various networks, which may include the Internet.

FIG. 1 illustrates production data 102. Generally, a primary copy 104 is generated from the production data 102. The primary copy 104 may be generated by a data protection application and may be a snapshot, a replica, or the like. In some examples, there may be multiple primary copies (e.g., snapshots that correspond to different points in time).

Secondary copies 120 may be generated from the primary copy 104. The number of secondary copies 120 associated with a particular primary copy or generated from a particular primary copy is not limited and may depend on needs or desires of the entity (e.g., the owner of the production data). In FIG. 1, the secondary copies 120 are represented by copies 106, 108, and 110. By way of example, the copy 106 may be used for devops, the copy 108 may be used for analytics, and the copy 110 may be used for monitoring purposes.

The secondary copies 120 are managed or controlled by a copy data management engine 130, which may be a server or an application operating on a server, or the like. The copy data management engine 130 is configured to manage the secondary copies 120. Managing the secondary copies 120 may include creating new secondary copies, deleting secondary copies, refreshing secondary copies, or the like or combination thereof. The copy data management engine 130 may also be able to generate the primary copies used in performing copy data management operations.

By way of example, the copy data management engine 130 is configured to refresh the secondary copies 120 or issue a request that causes the secondary copies 120 to be refreshed. Advantageously, embodiments of the invention refresh all of the secondary copies 120 (or a selected subset if desired) based on a single request and the secondary copies 120 are refreshed in parallel. This allows the source data for the refresh operation (e.g., the primary copy 104) to be read once and then written to each of the secondary copies 120 at the same time or at substantially the same time.

Figure 2:
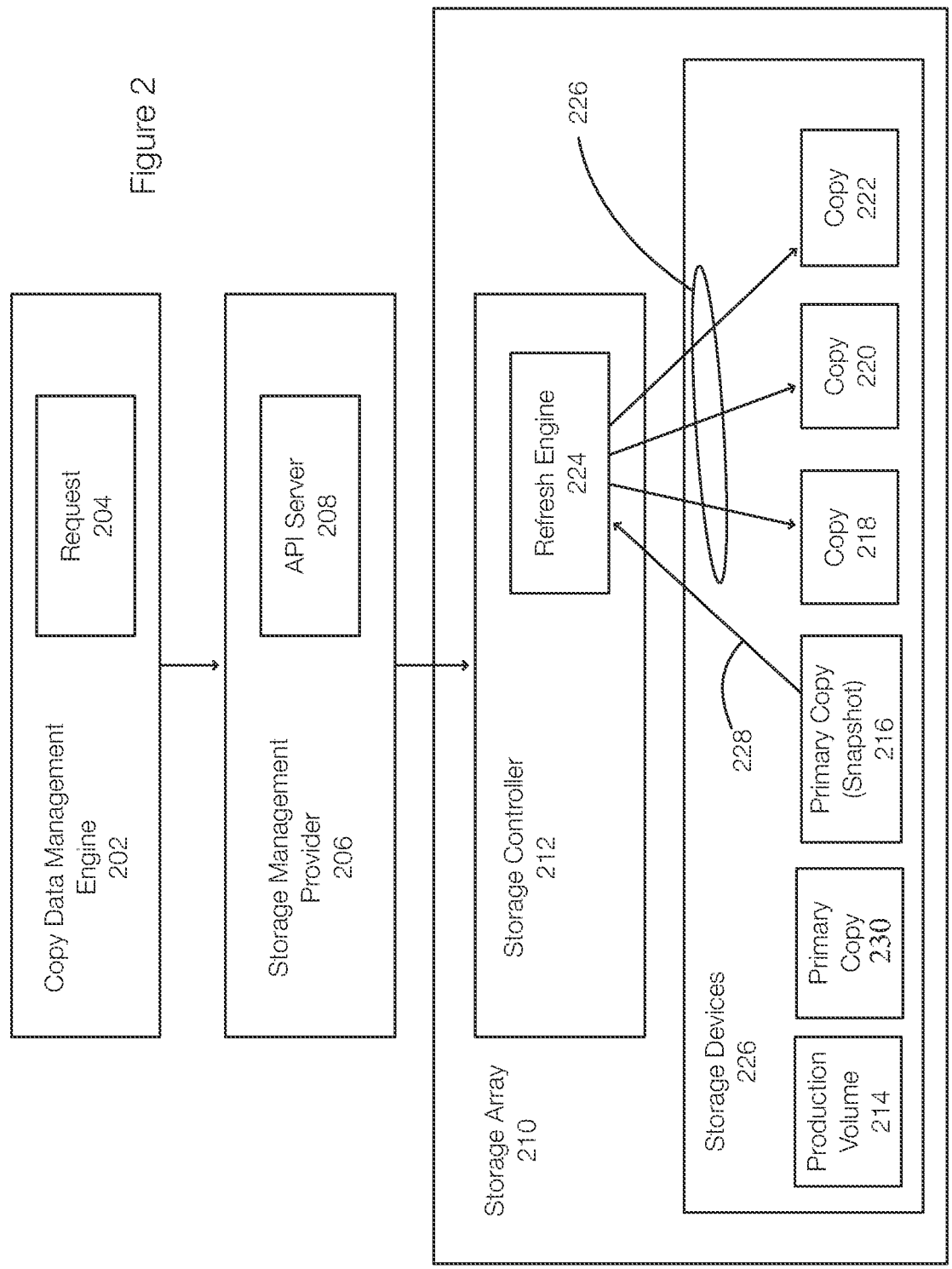

FIG. 2 discloses aspects of a copy data management engine configured to perform copy management operations including refresh operations.

FIG. 2 illustrates a storage array 210. The storage array 210 may include a storage controller 212 and storage devices 226. The storage controller 212 may include a processor, memory and may be configured to perform processing including thread generation and thread management. The storage devices 226 may include physical disk drives or other storage devices. In this example, the storage available on the storage devices 226 may be organized into volumes and may be presented as volumes to consumers such as applications.

The volumes in the storage array 210 may include a production volume 214. The production volume 214 may be used by applications and stores production data. Applications interact with the production volume 214 during operation. As a result, data stored in the production volume 214 may be continually changing and data may be deleted, added, or changed.

A primary copy 216, such as a snapshot (or multiple snapshots) may also be stored on the storage devices 226 any may be stored on a volume therein. The primary copy 216 thus corresponds, by way of example only, to a point in time copy of the data on the production volume 214.

The copy data management engine 202, which is an example of the copy data management engine 130, may issue a command or request 204 to create a secondary copy 218. At later times or at the same time, the copies 220 and 222 may be created by the engine 202. The request 204 from the engine 202 may be a delete request to delete one or more of the secondary copies 218, 220 and 222. The secondary copies 218, 220, and 222 may also be generated from the same primary copy 216.

For example, the secondary copy 218 is a copy of the primary copy 216. When a request to create the copy 218 is received, the primary copy 216, from which the copy 218 is being created, is read and the data read is written to the copy 218. The secondary copies 220 and 220 are created in a similar manner. In this example, each of the secondary copies 218, 220 and 220 were created from the same source—the primary copy 216.

The secondary copies 218, 220, and 222 may be refreshed one or more times. Although the copies 218, 220 and 222 can be refreshed from different sources (e.g., different primary copies), the secondary copies 218, 220, and 222 are refreshed from the same primary copy in this example.

The primary copy used for a refresh operation may differ from the primary copy used to create the secondary copies. For example, if the copies 218, 220 and 222 were created from a primary copy 230, the secondary copies 218, 220 and 222 may be refreshed from a new primary copy 216 that corresponds to a later point in time than the copy 230. The copies 218, 220 and 222 can be refreshed based on incremental logs or change logs related to the primary copy 216.

In this example, the secondary copies 218, 220 and 222 are refreshed using the primary copy 216. In this example, the primary copy 216 was specified in the refresh request generated by the engine 202. The primary copy 216 serving as the single source for the refresh operation may be different from the copy used to create the secondary copies 218, 220 and 222.

As previously indicated, the secondary copies 218, 220 and 222 may be used for various purposes such as devops, analytics, and monitoring. In order to achieve these purposes, it may be useful to perform these functions using data that is as recent as possible such that the results are more relevant to the production data stored in the production volume 214. Thus, the copies 218, 220 and 222 are refreshed periodically or repeated overly time from a specified primary copy, which is the copy 216 in this example. The secondary copies 218, 220 and 220 may be refreshed each time a new snapshot is generated from the new snapshot.

FIG. 2 also illustrates a storage management provider 206 that is associated with an API server 208. Embodiments of the invention may include an API server 208 that allows the engine 202 to interact with the storage array 210 and manage the secondary copies stored therein.

To refresh the secondary copies 218, 220 and 222, the engine 202 may issue a request 204. The request 204 may be "refresh copies 218, 220 and 222 from primary copy 216". Thus, the request 204 identifies the source of the refresh operation and the targets of the refresh operation. The request 204 is received by the API server 208 and then issued or provided to the storage controller 212. Thus, the API server 208 processes a single request that allows multiple secondary copies to be refreshed in parallel, simultaneously, or the like.

The command or request is received by the storage controller 212 and implemented by the storage controller 212 by a refresh engine 224. The refresh engine 224 is configured to read 228 the source (the primary copy 216) identified in the refresh request 204. By reading the source a single time, multiple secondary copies 218, 220 and 222 can be updated in parallel by spawning a thread for each of the copies 218, 220 and 222. Thus, the primary copy 216 is read once and multiple copies 218, 220 and 222 are refreshed in parallel using threads 226 in this example.

This substantially improves performance compared to a serial refresh where each of the copies 218, 220 and 222 are refreshed serially. Embodiments of the invention allow the lifecycle of each secondary copy to be managed independently. At the same time, aspects of the lifestyle can also be managed collectively. This provides additional flexibility in performing copy management operations.

In one example of a refresh operation, the primary copy 216 is read once. However, this may occur in a streaming or chunk fashion. For example, a chunk may be read by the refresh engine 224 and then written using the threads 226. This process of reading chunks and writing in parallel to the targets is repeated until the refresh operation is completed.

Figure 3:
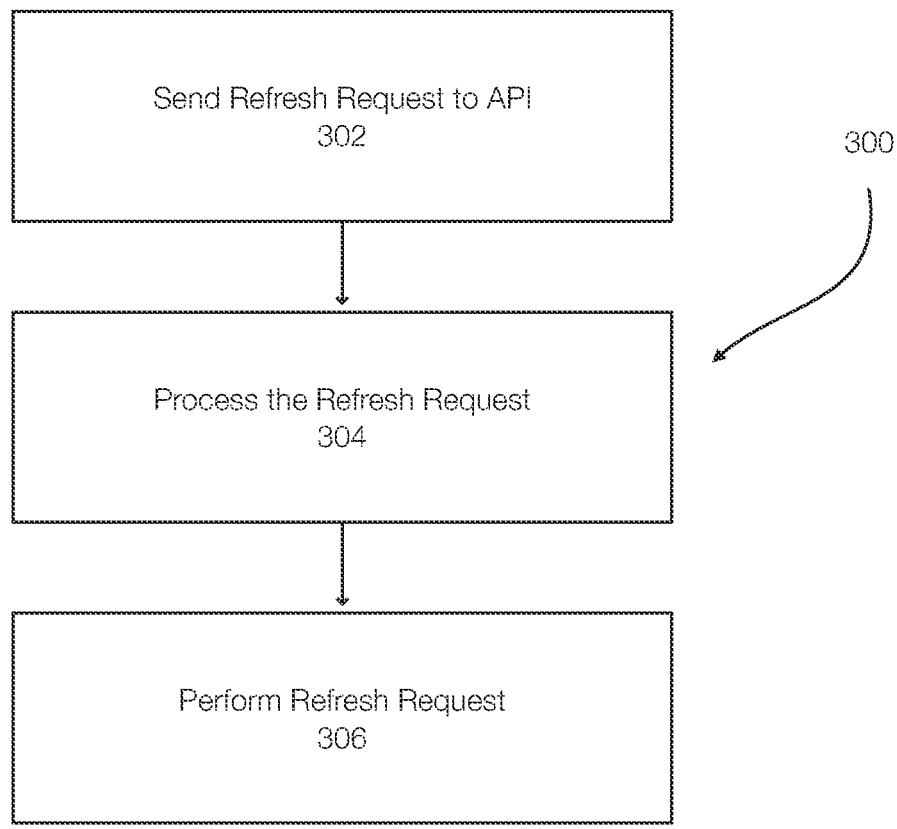
FIG. 3 discloses aspects of performing a refresh operation in copy data management.

FIG. 3 discloses aspects of a method for copy data management. In particular, FIG. 3 discloses aspects of a refresh operation in copy data management. In the method 300, a refresh request is sent 302 to an API server. The API server then processes 304 the refresh request.

Processing the refresh request may include identifying the primary copy and the target secondary copies. Processing the refresh request may include identifying relevant information about the primary and secondary copies such as addresses and the like. The API server thus sends instructions to a storage controller. The storage controller then performs 306 the refresh request. This may include spawning threads that are each configured to each write data read from a single source device to a different target device. This allows multiple secondary copies to be refreshed in parallel from a single source.

In one example, the API server 208 may be integrated into the storage controller 212 and/or into the refresh engine 224. At the storage controller 212 level, the source data is read once and written to multiple secondary copies via multiple threads in parallel.

Advantageously, management of secondary copies and refreshing copies becomes seamless in the sense that multiple secondary copies are refreshed together from the same source. Efficiency is also enhanced for both the storage array 210 and the copy data management engine 202. Further, the complexities of copy data management workflows is reduced when refreshing secondary copies in batch.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, copy data management operations, which may include, but are not limited to, data replication operations, IO replication operations, data read/write/delete operations, data backup operations, data cloning operations, refresh operations, thread spawning and management operations, or the like. More generally, the scope of the invention embraces any operating environment in which the disclosed concepts may be useful.

At least some embodiments of the invention provide for the implementation of the disclosed functionality in existing platforms or applications, examples of which include DELL EMC Appsync.

New and/or modified data collected and/or generated in connection with some embodiments, may be stored in a data environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM) or containers.

Particularly, devices in the operating environment may take the form of software, physical machines, VMs, containers, or any combination of these, though no particular device implementation or configuration is required for any embodiment. Similarly, data system components such as databases, storage servers, storage volumes (LUNs), storage disks, replication services, backup servers, restore servers, backup clients, and restore clients, for example, may likewise take the form of software, physical machines or virtual machines (VM) or containers, though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a request to refresh secondary copies from a single source in a storage system at a storage API (Application Programming Interface), instructing a storage controller included in the storage system to perform the request, and refreshing the secondary copies by: reading data from the single source, and writing the data read from the single source to each of the secondary copies with threads, wherein each thread included in the threads is associated with a different one of the secondary copies.

Embodiment 2. The method of embodiment 1, further comprising formulating the request by identifying the single source, wherein the single source is a primary copy of production data in the storage system.

Embodiment 3. The method of embodiment 1 and/or 2, further comprising specifying the secondary sources in the request.

Embodiment 4. The method of embodiment 1, 2, and/or 3, further comprising processing the requests by the storage API.

Embodiment 5. The method of embodiment 1, 2, 3, and/or 4, further comprising instructing the storage controller to refresh the secondary copies identified in the request from the primary copy.

Embodiment 6. The method of embodiment 1, 2, 3, 4, and/or 5, wherein the primary copy is different from a primary copy used to create the secondary copies.

Embodiment 7. The method of embodiment 1, 2, 3, 4, 5, and/or 6, further comprising spawning the threads.

Embodiment 8. The method of embodiment 1, 2, 3, 4, 5, 6, and/or 7, further comprising reading the primary copy in a streaming manner or in chunks.

Embodiment 9. The method of embodiment 1, 2, 3, 4, 5, 6, 7, and/or 8, further comprising generating the primary copy.

Embodiment 10. The method of embodiment 1, 2, 3, 4, 5, 6, 7, 8, and/or 9, wherein each of the secondary copies is associated with a different purpose.

Embodiment 11. A method for performing any of the operations, methods, or processes, or any portion of any of these or any combination thereof, disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
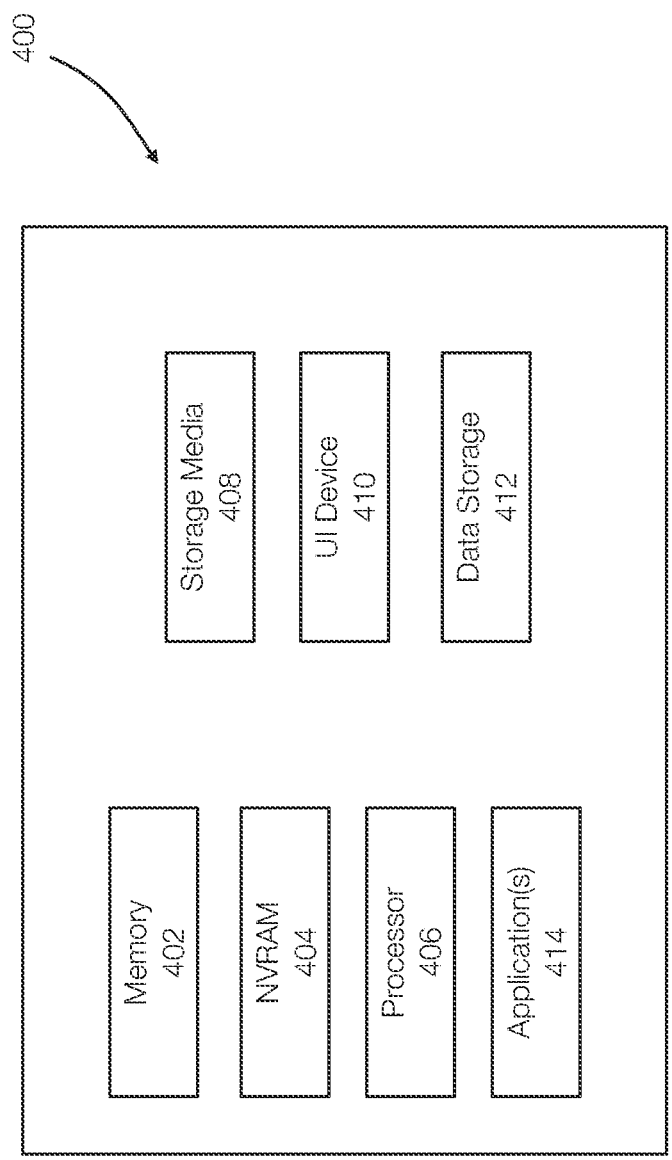
FIG. 4 discloses aspects of a computing system or a computing device.

With reference briefly now to FIG. 4 any one or more of the entities disclosed, or implied, by the Figures and/or elsewhere herein, may take the form of, or include, or be implemented on, or hosted by, a physical computing device or in a computing system, one example of which is denoted at 400.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 416 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a request to refresh secondary copies from a single source in a storage system;
   instructing a storage controller included in the storage system to perform the request; and
   refreshing the secondary copies by:
   reading data from the single source a single time; and
   writing the data read from the single source to each of the secondary copies in parallel.

2. The method of claim 1, wherein the single source is a primary copy of a production source.

3. The method of claim 2, further comprising formulating the request such that the request identifies the single source.

4. The method of claim 3, further comprising specifying the secondary copies in the request.

5. The method of claim 2, further comprising generating a new primary copy such that the single source is the new primary copy.

6. The method of claim 5, further comprising refreshing the secondary copies from the new primary copy.

7. The method of claim 2, further comprising writing data read from the primary copy with threads, wherein each of the threads is associated with a different one of the secondary copies.

8. The method of claim 5, further comprising writing data ready from the new primary copy with threads, wherein each of the threads is associated with a different one of the secondary copies.

9. The method of claim 2, further comprising reading the primary copy in a streaming manner or in chunks.

10. A method comprising:
    receiving a request to refresh secondary copies of a production source from a primary copy of the production source, wherein the primary copy is stored in a storage system;
    instructing a storage controller included in the storage system associated with the primary copy to perform the request; and
    refreshing the secondary copies by:
    reading data from the primary copy a single time; and
    writing the data read from the primary copy to each of the secondary copies in parallel.

11. The method of claim 10, further comprising formulating the request such that the request identifies the primary copy and such that the request specifies the secondary copies.

12. The method of claim 10, further comprising reading the primary copy in a streaming manner or in chunks.

13. The method of claim 10, wherein each of the secondary copies is associated with a different purpose.

14. The method of claim 10, further comprising writing data read from the primary copy with threads, wherein each of the threads is associated with a different one of the secondary copies.

15. The method of claim 10, further comprising generating a new primary copy.

16. The method of claim 15, further comprising refreshing the secondary copies from the new primary copy, wherein each of the secondary copies is associated with a different purpose.

17. The method of claim 15, further comprising writing data ready from the new primary copy with threads, wherein each of the threads is associated with a different one of the secondary copies.

18. A non-transitory storage medium having stored therein instructions that are executable by one or more hardware processors to perform operations comprising:
    receiving a request to refresh secondary copies of a production source from a primary copy of the production source, wherein the primary copy is stored in a storage system;

instructing a storage controller included in the storage system associated with the primary copy to perform the request; and refreshing the secondary copies by:
reading data from the primary copy a single time; and
writing the data read from the primary to each of the secondary copies in parallel.

19. The non-transitory storage medium of claim 18, further comprising:
formulating the request such that the request identifies the primary copy and such that the request specifies the secondary copies;
writing data read from the primary copy with threads, wherein each of the threads is associated with a different one of the secondary copies; and
reading the primary copy in a streaming manner or in chunks.

20. The non-transitory storage medium of claim 18, further comprising:
generating a new primary copy;
refreshing the secondary copies from the new primary copy; and
writing data ready from the new primary copy with threads, wherein each of the threads is associated with a different one of the secondary copies, wherein each of the secondary copies is associated with a different purpose.

* * * * *